(12) United States Patent
Kodama

(10) Patent No.: US 9,197,782 B2
(45) Date of Patent: Nov. 24, 2015

(54) IMAGE PROCESSING DEVICE AND IMAGE PROCESSING METHOD

(71) Applicant: Daichi Kodama, Kanagawa (JP)

(72) Inventor: Daichi Kodama, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 0 days.

(21) Appl. No.: 14/528,544

(22) Filed: Oct. 30, 2014

(65) Prior Publication Data

US 2015/0124297 A1 May 7, 2015

(30) Foreign Application Priority Data

Nov. 7, 2013 (JP) ................................ 2013-231331

(51) Int. Cl.
| | |
|---|---|
| *G06K 15/00* | (2006.01) |
| *H04N 1/40* | (2006.01) |
| *H04N 1/32* | (2006.01) |
| *H04N 1/387* | (2006.01) |

(52) U.S. Cl.
CPC ......... *H04N 1/32358* (2013.01); *H04N 1/3877* (2013.01); *H04N 1/40* (2013.01); *H04N 2201/0081* (2013.01); *H04N 2201/0091* (2013.01); *H04N 2201/0093* (2013.01); *H04N 2201/0094* (2013.01)

(58) Field of Classification Search
None
See application file for complete search history.

(56) References Cited

U.S. PATENT DOCUMENTS

| | | | | | |
|---|---|---|---|---|---|
| 4,597,016 | A | * | 6/1986 | Nakamura et al. | 382/245 |
| 4,641,246 | A | * | 2/1987 | Halbert et al. | 341/163 |
| 5,155,809 | A | * | 10/1992 | Baker et al. | 709/227 |
| 5,369,767 | A | * | 11/1994 | Dinwiddie et al. | 710/264 |
| 5,631,983 | A | * | 5/1997 | Ohnishi et al. | 382/284 |
| 6,347,202 | B1 | * | 2/2002 | Shishizuka et al. | 399/75 |
| 6,359,695 | B1 | * | 3/2002 | Takahashi et al. | 358/1.1 |
| 6,707,569 | B1 | * | 3/2004 | Kato et al. | 358/1.15 |
| 6,806,872 | B2 | * | 10/2004 | Mino et al. | 345/211 |
| 7,167,266 | B2 | * | 1/2007 | Sakai et al. | 358/1.15 |
| 8,387,860 | B2 | * | 3/2013 | Arakawa | 235/375 |
| 2005/0021883 | A1 | * | 1/2005 | Shishizuka et al. | 710/20 |
| 2006/0061795 | A1 | * | 3/2006 | Walmsley | 358/1.14 |
| 2006/0159338 | A1 | * | 7/2006 | Nako et al. | 382/167 |
| 2006/0208157 | A1 | * | 9/2006 | Michiie | 250/208.1 |
| 2008/0267524 | A1 | * | 10/2008 | Shaked et al. | 382/263 |
| 2009/0309707 | A1 | * | 12/2009 | Kamprath | 340/10.4 |
| 2014/0027611 | A1 | * | 1/2014 | Patel | 250/208.1 |

FOREIGN PATENT DOCUMENTS

| | | |
|---|---|---|
| JP | 2008-234065 | 10/2008 |
| JP | 2009-123091 | 6/2009 |

* cited by examiner

*Primary Examiner* — Madelein Nguyen
(74) *Attorney, Agent, or Firm* — Oblon, McClelland, Maier & Neustadt, L.L.P.

(57) ABSTRACT

An image processing device includes a main memory, a parameter register, an image processor, and a parameter transfer unit. The main memory stores therein a parameter used in image processing. The parameter register temporarily stores therein the parameter. The image processor executes the image processing on image data by using the parameter stored in the parameter register. The parameter transfer unit transfers the parameter stored in the main memory to the parameter register during a period in which the image processing is not executed.

8 Claims, 6 Drawing Sheets

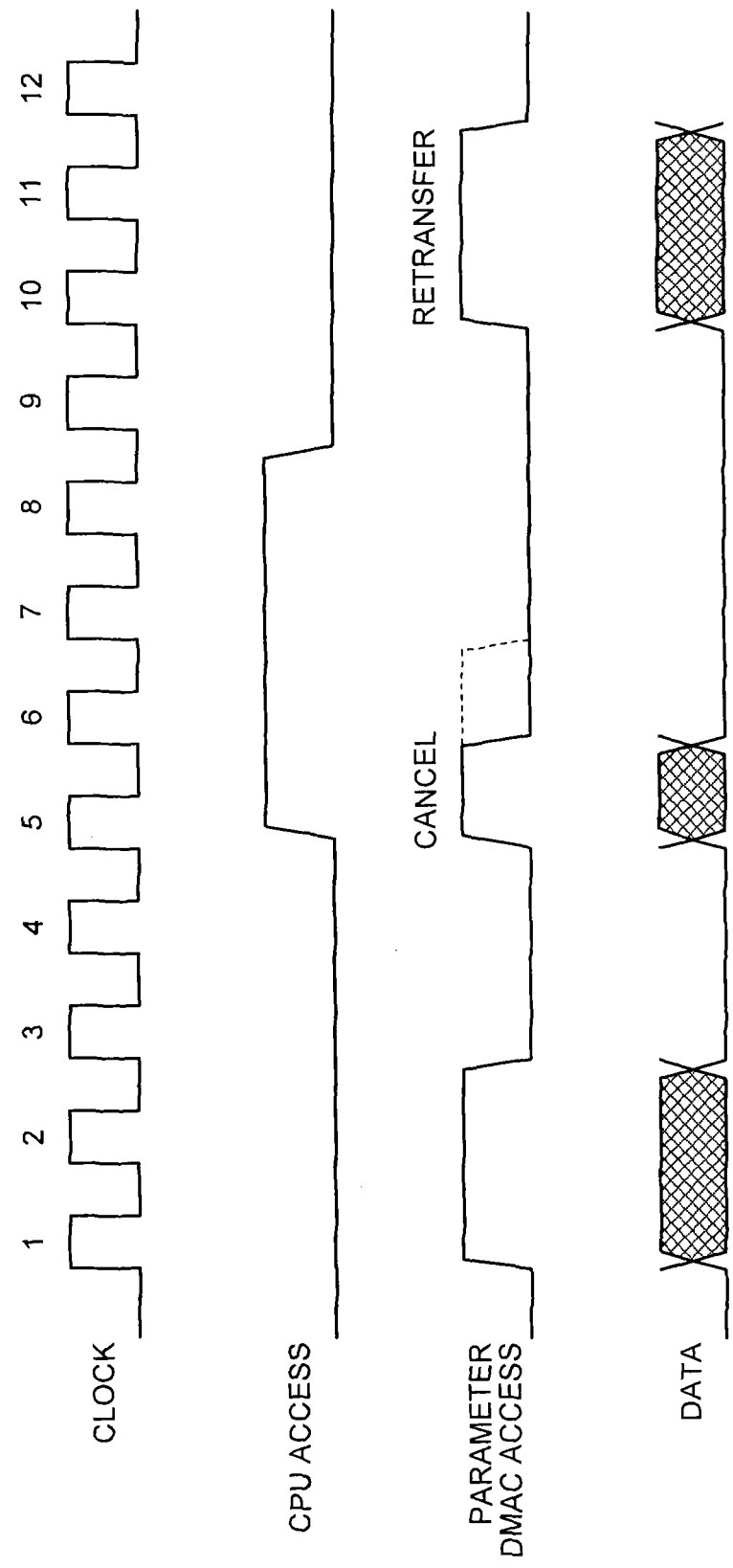

IMAGE PROCESSING DEVICE AND IMAGE PROCESSING METHOD

CROSS-REFERENCE TO RELATED APPLICATIONS

The present application claims priority to and incorporates by reference the entire contents of Japanese Patent Application No. 2013-231331 filed in Japan on Nov. 7, 2013.

BACKGROUND OF THE INVENTION

1. Field of the Invention

The present invention relates to an image processing device and an image processing method.

2. Description of the Related Art

There has been known a scanner device for reading an original and converting it into digital data. The scanner device is also provided in, for example, a copying device, a printer device, a facsimile device, a multifunction device provided with any two of the above, or the like. In recent years, the scanner device has a mechanism for reading front and back sides of a double-sided original simultaneously in paper feeding at once (i.e., one-pass double-sided simultaneous reading mechanism) through an original reading unit. By using the scanner device having this mechanism, it is possible to read two sides in a period of time for reading one side, whereby productivity can be improved.

The scanner device having this function is capable of reducing a reading time, but it is necessary to parallelize image processing of image data of two sides, whereby a total cost is increased. To solve this problem, there has been proposed a scanner device in which an inexpensive local memory is arranged. The scanner device temporarily accumulates the read images of two sides in the local memory, performs the image processing one side by one side in order, and transfers it to an output device. In this way, the scanner device having this mechanism is capable of improving the productivity of reading the double-sided original while decreasing the total cost.

Note, however, that in the one-pass double-sided simultaneous reading mechanism, a sensor of the original reading unit is physically different between that for a front side and that for a back side, whereby color tone and the like of the read image data are different between the front side and the back side. Accordingly, it is necessary for the scanner device having this mechanism to perform the image processing one side by one side in order by alternately switching a parameter used for image quality adjustment between image processing of the front side and image processing of the back side.

Prior to execution of the image processing, the parameter used for image quality adjustment is transferred from a main memory to a target register. Therefore, the conventional scanner device is provided with a specialized parameter direct memory access controller (DMAC) for rewriting the parameter. Thus, in the conventional scanner device, overheads of parameter rewriting performed between the image processing of the front side and image processing of the back side is decreased while a processing load of a central processing unit (CPU) is also reduced.

A conventional parameter DMAC starts transfer of a parameter as soon as it receives a start instruction from a CPU. Therefore, it is necessary for the CPU to manage start timing of the parameter DMAC by following a software program and the like. However, in order for the CPU to detect the start timing, it is necessary to execute, for example, receiving an interruption signal or reading a register, which required processing time.

Furthermore, in a case where one parameter DMAC is used commonly by a scanner and a plotter, or in a case where one parameter DMAC is used commonly by a plurality of pieces of color plane data, it is necessary for the CPU to check whether or not the parameter DMAC is used for a different purpose and to determine priority of each processing, thereby giving the start instruction to the parameter DMAC. Moreover, there is a possibility of access competition since both of the CPU and the parameter DMAC access the register. Accordingly, the CPU needs to manage an operation condition of the parameter DMAC, whereby control thereof has been complicated.

Therefore, there is a need for an image processing device and method capable of reducing load on a processor without making the processor such as the CPU to manage timing of transfer of a parameter used in image processing.

SUMMARY OF THE INVENTION

According to an embodiment, an image processing device includes a main memory, a parameter register, an image processor, and a parameter transfer unit. The main memory stores therein a parameter used in image processing. The parameter register temporarily stores therein the parameter. The image processor executes the image processing on image data by using the parameter stored in the parameter register. The parameter transfer unit transfers the parameter stored in the main memory to the parameter register during a period in which the image processing is not executed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a view illustrating the timing in a case where the transfer of the parameter is cancelled or the parameter is retransferred.

DETAILED DESCRIPTION OF THE PREFERRED EMBODIMENTS

Hereinafter, an embodiment according to the present invention is described in detail based on the drawings. Note that the present invention is not to be limited by the embodiment.

Figure 1:
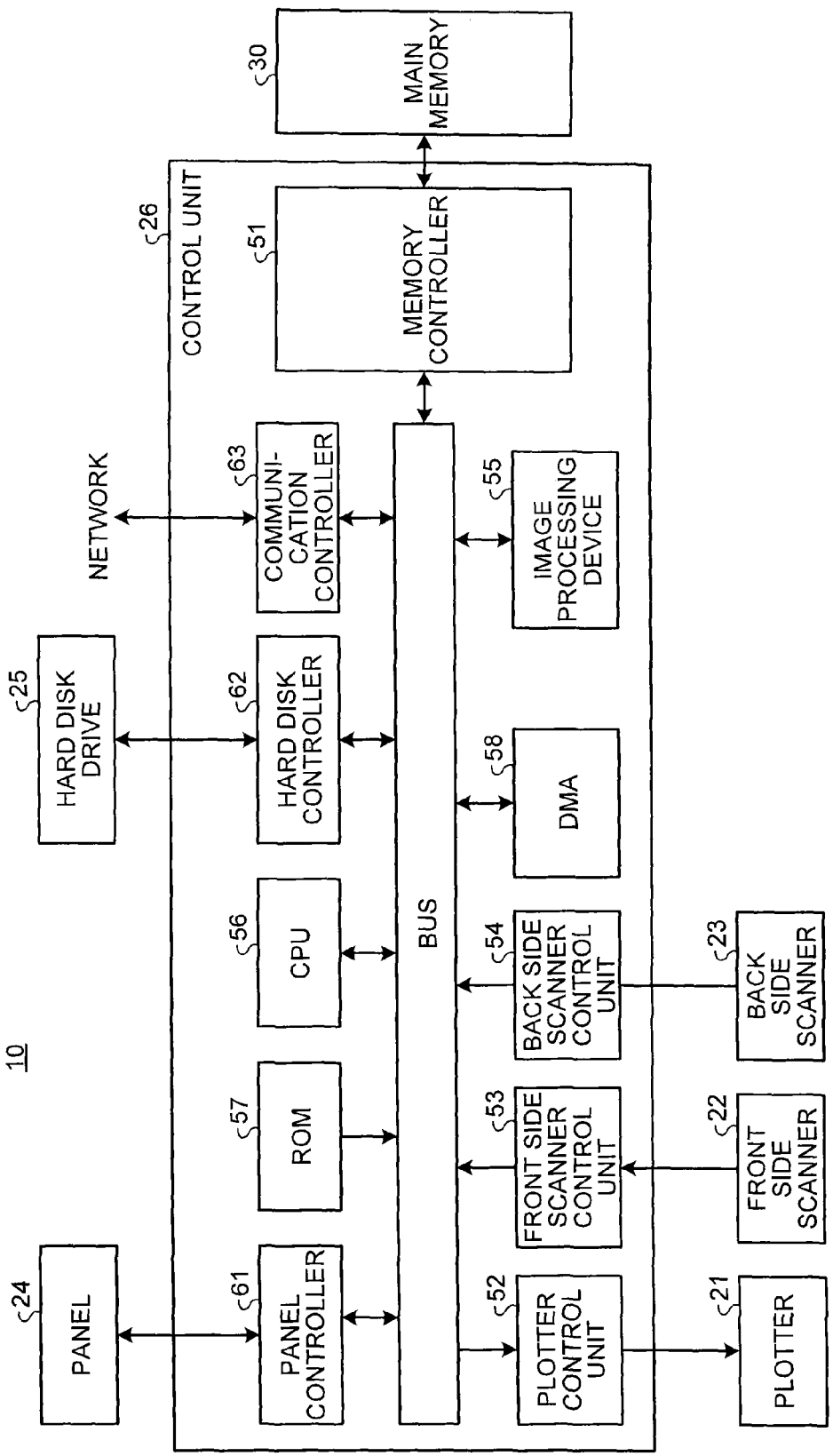
FIG. 1 is a view illustrating a configuration of an image forming device according to an embodiment.

FIG. 1 is a view illustrating a configuration of an image forming device 10. The image forming device 10 is a device having a scanner and a printer. The image forming device 10 is used, for example, as a copying device, a printer device, a facsimile device, a multifunction device provided with any two of the above, or the like.

The image forming device 10 is provided with a plotter 21, a front side scanner 22, a back side scanner 23, a panel 24, a hard disk drive 25, a control unit 26, and a main memory 30.

The plotter 21 prints an image based on image data on paper. The front side scanner 22 optically reads an image on a front side of the paper and generates image data expressing the image on the front side of the paper. The back side scanner 23 optically reads an image on a back side of the paper and generates image data expressing the image on the back side of the paper. The front side scanner 22 and the back side scanner 23 simultaneously generate the image data of the front side and the image data of the back side by a mechanism for simultaneously reading the front and back sides of a double-sided original in paper feeding at once.

The panel 24 displays information for a user as well as receives input of operational information from the user. The hard disk drive 25 is a non-volatile large capacity storage device storing therein image data that has been read and image data for printing.

The control unit 26 controls the plotter 21, the front side scanner 22, the back side scanner 23, the panel 24, and the hard disk drive 25 and also controls the whole device. The main memory 30 is a volatile semiconductor memory such as a dynamic random access memory (DRAM). The main memory 30 is connected to the control unit 26 and stores therein the image data to be subjected to image processing, and a parameter used in the image processing.

The main memory 30 stores therein the parameter used in the image processing for each of a plurality of image data systems (i.e., a plurality of paths). As an example, the main memory 30 stores therein a parameter for each color plane (for example, Y, M, C, and K) of image data to be printed and for each color plane (for example, Y, M, C, and K) of image data that has been scanned. Furthermore, for the image data that has been scanned, the main memory 30 stores a different parameter depending on whether it is the front side or the back side.

The control unit 26 has a memory controller 51, a plotter control unit 52, a front side scanner control unit 53, a back side scanner control unit 54, an image processing device 55, a CPU 56, a read only memory (ROM) 57, a direct memory access (DMA) 58, a panel controller 61, a hard disk controller 62, and a communication controller 63. Each functional block is formed on one or more chips, for example, and is mutually connected through a bus or an interface.

The memory controller 51 controls access to the main memory 30. The plotter control unit 52 controls the plotter 21. The plotter control unit 52 receives the image data to be printed, which is stored in the main memory 30, and causes the plotter 21 to print it.

The front side scanner control unit 53 controls the front side scanner 22. The front side scanner control unit 53 performs correction such as shading correction on the image data read by the front side scanner 22 and stores it in the main memory 30.

The back side scanner control unit 54 controls the back side scanner 23. Furthermore, the back side scanner control unit 54 performs correction such as shading correction on the image data read by the back side scanner 23 and stores it in the main memory 30.

The image processing device 55 obtains the image data stored in the main memory 30 and executes the image processing thereon. Then, the image processing device 55 stores the image data that has been subjected to the image processing in the main memory 30.

The image processing device 55 obtains, for each path of the image data, a parameter from the main memory 30 and executes the image processing by using the obtained parameter. Furthermore, on two pieces of image data obtained by scanning both of the front side and the back side of paper simultaneously in paper feeding at once, the image processing device 55 executes the image processing by alternately switching between the front side and the back side in one path. In this case, the image processing device 55 switches between a parameter to be used in the image processing of the front side and a parameter to be used in the image processing of the back side, before its corresponding processing starts.

The CPU 56 is a processor that controls the whole device by executing a program. The ROM 57 stores therein the program and the like executed by the CPU 56.

The DMA 58 controls transfer of image data from the main memory 30 to another unit or transfer of image data from another unit to the main memory 30 in place of the CPU 56. As an example, in synchronization with operation of the plotter 21, the DMA 58 reads the image data to be printed from the main memory 30 and transfers it to the plotter control unit 52. Furthermore, as an example, in synchronization with operation of the front side scanner 22, the DMA 58 obtains the image data of the front side from the front side scanner control unit 53 and writes it to the main memory 30. Moreover, as an example, in synchronization with operation of the back side scanner 23, the DMA 58 obtains the image data of the back side from the back side scanner control unit 54 and writes it to the main memory 30.

The DMA 58 reads image data to be processed by the image processing device 55 from the main memory 30 and transfers it to the image processing device 55. Furthermore, the DMA 58 obtains the image data that has been subjected to the image processing by the image processing device 55 and writes it to the main memory 30.

The panel controller 61 controls the panel 24. The hard disk controller 62 controls data writing to and data reading from the hard disk drive 25. The communication controller 63 controls communication with an external computer and the like through the network.

Figure 2:
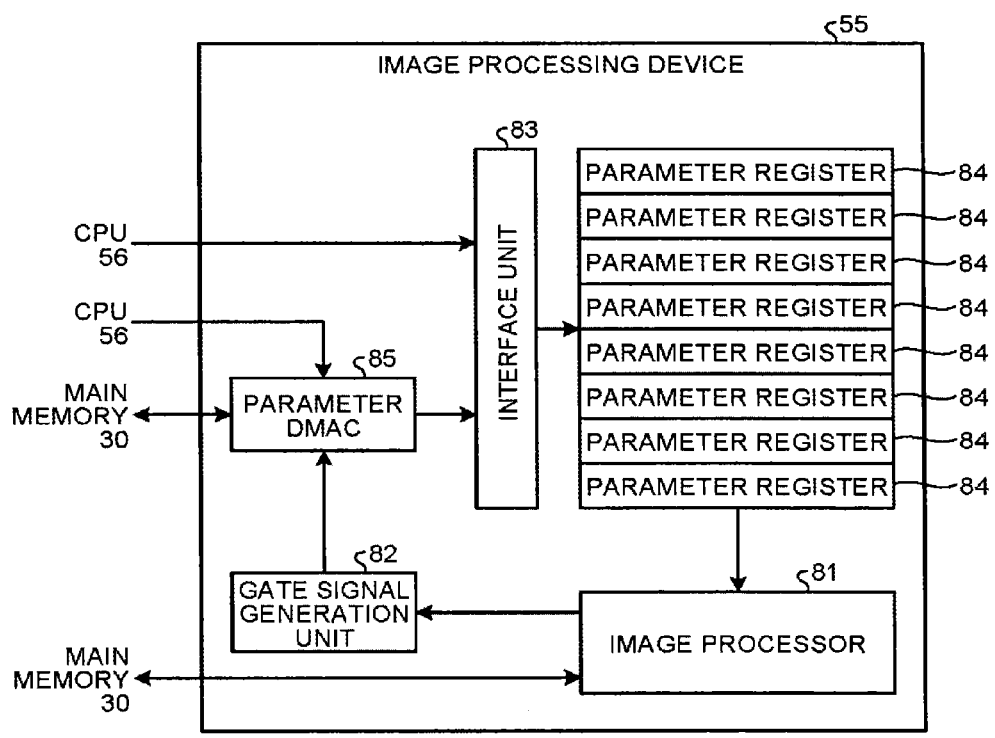
FIG. 2 is a view illustrating a configuration of an image processing device.

FIG. 2 is a view illustrating a configuration of the image processing device 55. The image processing device 55 includes an image processor 81, a gate signal generation unit 82, an interface unit 83, a plurality of parameter registers 84, and a parameter DMAC 85.

The image processor 81 executes image processing on each piece of image data of the plurality of paths. As an example, the image processor 81 executes gamma correction, filter processing, color correction, and the like on each piece of color plane image data (for example, each piece of Y, M, C, and K plane image data) to be printed and on each piece of color plane image data (for example, each piece of Y, M, C, and K plane image data) that has been scanned.

The gate signal generation unit 82 generates a gate signal expressing an execution period of the image processing by the image processor 81 for each of the plurality of paths. The gate signal becomes valid (asserted) during the execution period of the image processing and becomes invalid (negated) during a period in which the image processing is not executed.

The interface unit 83 accepts access from the CPU 56 or the parameter DMAC 85 for writing a parameter to the plurality of parameter registers 84.

The plurality of parameter registers 84 temporarily stores therein the parameters that are used in the image processing and respectively correspond to the pieces of the image data of the plurality of paths. The plurality of parameter registers 84 includes, as an example, the parameter register 84 that stores parameters respectively corresponding to the pieces of the color plane image data (for example, pieces of Y, M, C, and K plane image data) to be printed and the parameter register 84 that stores parameters corresponding to the pieces of the color plane image data (for example, pieces of Y, M, C, and K plane image data) that has been scanned. Furthermore, with respect to each of the paths of the image data that has been scanned, the plurality of parameter registers 84 includes the parameter register 84 that stores a parameter corresponding to the image data of the front side and the parameter register 84 that stores a parameter corresponding to the image data of the back side.

The parameter DMAC 85, in response to an instruction from the CPU 56, reads a parameter corresponding to the image data of a path that is instructed by the main memory 30 and transfers it to the corresponding parameter register 84.

In the image processing device 55 having this configuration, prior to execution of the image processing on image data of each path, the image processor 81 reads a parameter from the corresponding parameter register 84. Then, the image processor 81 executes the image processing on the image data by using the parameter stored in the parameter register 84.

Furthermore, on the image data that has been scanned both of the front side and the back side thereof simultaneously in paper feeding at once, the image processor 81 executes the image processing by alternately switching between the front side and the back side in one path. In this case, the image processing device 55 reads a parameter from the corresponding parameter register 84 for each period between sheets of paper and switches between the parameter used in the image processing of the front side and a parameter used in image processing of the back side.

Figure 3:
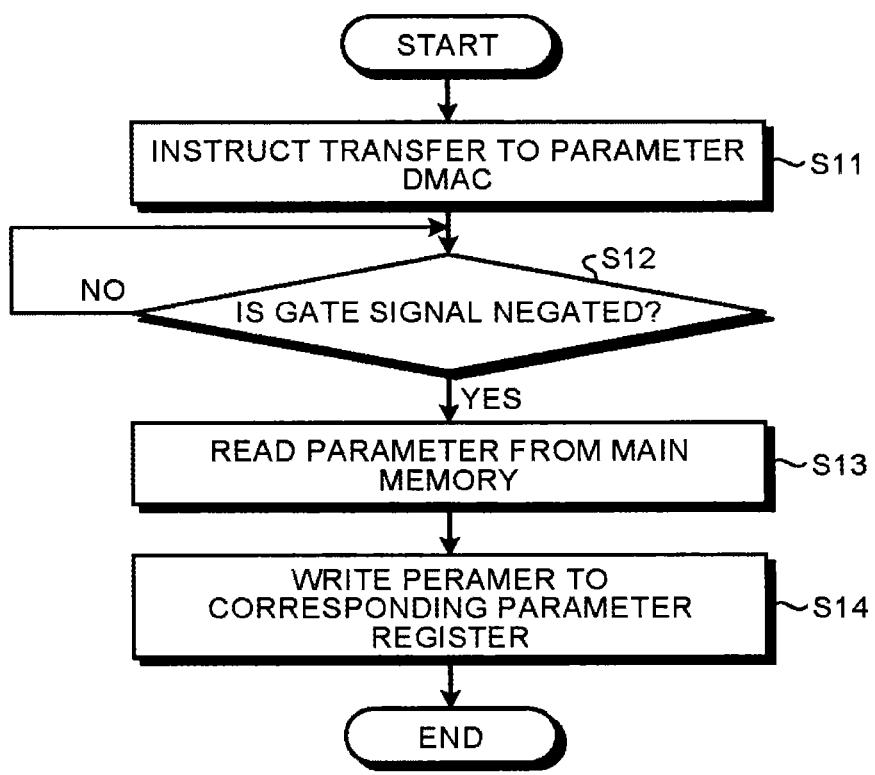
FIG. 3 is a view illustrating a processing flow of the image processing device.

FIG. 3 is a view illustrating a processing flow of the image processing device 55. In a case where the image processing on image data of a certain path is to be executed by the image processing device 55, prior to the image processing, the CPU 56 transfers a corresponding parameter from the main memory 30 to the corresponding parameter register 84. In this case, the CPU 56 may execute transfer processing by itself or may cause the parameter DMAC 85 to perform the transfer.

In a case where the CPU 56 causes the parameter DMAC 85 to perform the transfer of a parameter, the processing is executed in an order illustrated in FIG. 3.

First, in step S11, the CPU 56 gives a parameter transfer instruction to the parameter DMAC 85. When the parameter DMAC 85 receives the parameter transfer instruction, subsequently, in step S12, the parameter DMAC 85 determines whether or not the gate signal is negated.

The parameter DMAC 85 is on standby at step S12 for the next processing until the gate signal is negated. Once the gate signal is negated, the parameter DMAC 85 can proceed to processing in step S13.

In step S13, the parameter DMAC 85 reads a parameter from the main memory 30. Subsequently, in step S14, the parameter DMAC 85 writes the read parameter to the corresponding parameter register 84.

The image processing device 55, which executes such processing, can transfer the parameter from the main memory 30 to the corresponding parameter register 84 in a case where the image processing device 33 receives the parameter transfer instruction from the CPU 56 and the corresponding gate signal is negated.

Figure 4:
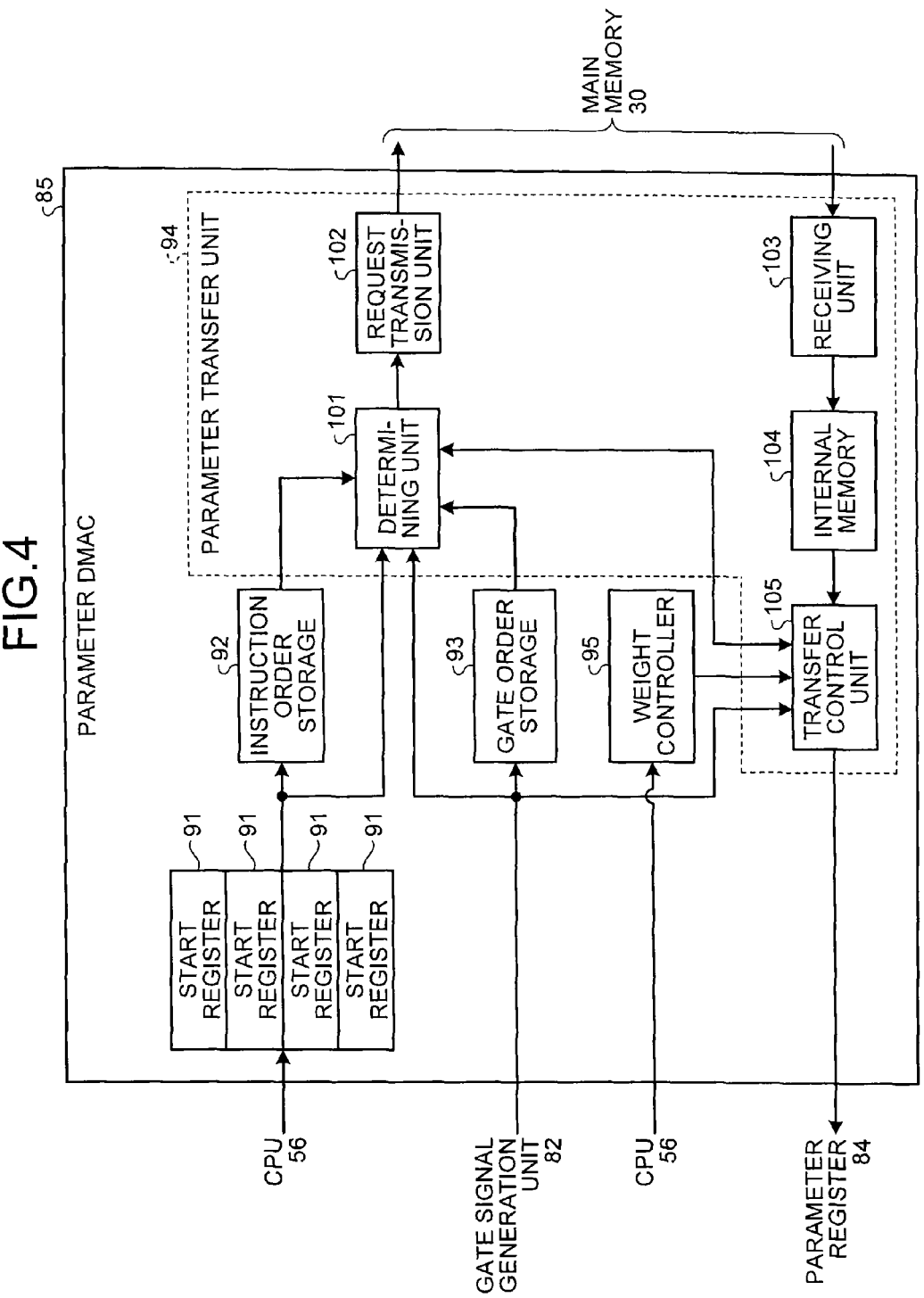
FIG. 4 is a view illustrating a configuration of a parameter DMAC.

FIG. 4 is a view illustrating a configuration of the parameter DMAC 85. The parameter DMAC 85 has a plurality of start registers 91, an instruction order storage 92, a gate order storage 93, a parameter transfer unit 94, and a weight controller 95.

The plurality of start registers 91 stores therein the transfer instructions that are given from the CPU 56 and respectively correspond to the pieces of the image data of the plurality of paths. The plurality of start registers 91 includes, as an example, the start register 91 that stores transfer instructions respectively corresponding to the pieces of the color plane image data (for example, pieces of Y, M, C, and K plane image data) to be printed and the start register 91 that stores transfer instructions respectively corresponding to the pieces of the color plane image data (for example, pieces of Y, M, C, and K plane image data) that has been scanned. Furthermore, with respect to each of the paths of the image data that has been scanned, the plurality of start registers 91 includes the start register 91 that stores a transfer instruction corresponding to the image data of the front side and the start register 91 that stores a transfer instruction corresponding to the image data of the back side.

The instruction order storage 92 stores therein an order in which the transfer instructions have been asserted to the plurality of start registers 91. The gate order storage 93 stores therein an order in which gate signals, each representing the execution period of the image processing on the image data of each of the plurality of paths, have been negated.

In a case where the transfer instruction is asserted to any of the start registers 91, the parameter transfer unit 94 transfers a parameter of image data of a corresponding path from the main memory 30 to the corresponding parameter register 84. In this case, during a period in which the gate signal, representing the execution period of the image processing on the image data of a target path, is negated, the parameter transfer unit 94 transfers the parameter corresponding to the image data of the target path from the main memory 30 to the corresponding parameter register 84.

Specifically, the parameter transfer unit 94 includes a determining unit 101, a request transmission unit 102, a receiving unit 103, an internal memory 104, and a transfer control unit 105.

The determining unit 101 determines a path corresponding to a parameter to be transferred from the main memory 30 to the corresponding parameter register 84. More specifically, the determining unit 101 determines, as the path corresponding to the parameter to be transferred, a path for which the transfer instruction is asserted to the start register 91 from the CPU 56 and for which the gate signal is negated.

Furthermore, in a case where the transfer instructions are asserted to the start registers 91 corresponding to the plurality of paths, the determining unit 101 determines an order of transfer of a plurality of parameters based on an order in which the transfer instructions stored in the instruction order storage 92 have been asserted or an order in which the gate signals stored in the gate order storage 93 have been negated. Then, following the determined order of transfer, the determining unit 101 sequentially (i.e., one by one) determines the path corresponding to the parameter to be transferred.

As an example, the determining unit 101 determines the path corresponding to the parameter to be transferred by prioritizing the order in which the transfer instructions have been asserted. As another example, the determining unit 101 may determine the path corresponding to the parameter to be transferred by prioritizing the order in which the gate signals have been negated. Note that a mode in which the path is determined by prioritizing the order in which the transfer instructions have been asserted is called a transfer instruction priority mode, which is further described with reference to FIG. 5. A mode in which the path is determined by prioritizing the order in which the gate signals have been negated is called a gate signal priority mode, which is further described with reference to FIG. 6.

When the path is determined by the determining unit 101, the request transmission unit 102 transmits a read request (for data and address) of a parameter corresponding to the determined path to the main memory 30. The receiving unit 103 receives the parameter from the main memory 30 and temporarily stores it in the internal memory 104. The transfer control unit 105 writes the parameter, which has temporarily been stored in the internal memory 104, to the parameter register 84 corresponding to the path for which the transfer instruction has been asserted.

The weight controller 95 monitors whether or not the CPU 56 is accessing the parameter register 84. Then, during a period in which the CPU 56 is accessing the parameter register 84, the weight controller 95 instructs to cancel transfer of the parameter by the parameter transfer unit 94. The transfer control unit 105 of the parameter transfer unit 94, which has received the instruction to cancel the transfer, cancels the transfer of the parameter.

After the transfer of the parameter is cancelled, in a case where the CPU 56 has completed accessing the parameter register 84, the weight controller 95 gives an instruction to retransfer the parameter of which the transfer has been cancelled to the transfer control unit 105 of the parameter transfer unit 94. In a case where there is a parameter of which the transfer has been cancelled in the middle, the transfer control unit 105, which has received the instruction to retransfer, retransfers the parameter of which the transfer has been cancelled in the middle to the corresponding parameter register 84.

Figure 5:
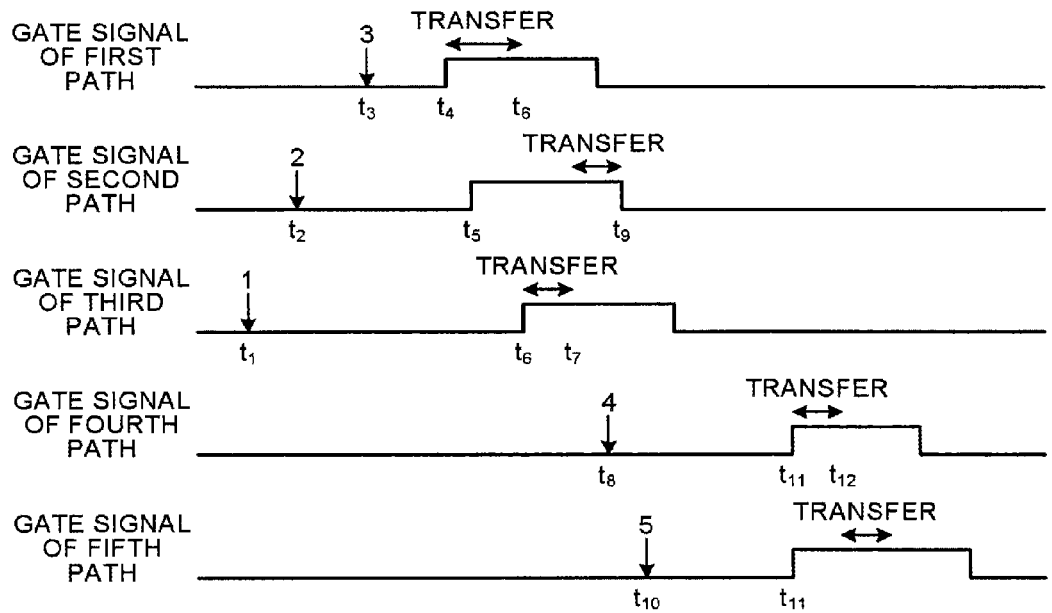
FIG. 5 is a view illustrating timing of transfer of a parameter in a case where assertion to a start register is prioritized.

FIG. 5 is a view illustrating timing of the transfer of the parameter in a case where assertion to the start register 91 is prioritized.

In FIG. 5, the gate signals of first to fifth paths are illustrated. In the gate signals of this example, L logic represents valid and H logic represent invalid (negation). Instead of this negative logic gate signal, it is also possible to use a positive logic gate signal. In FIG. 5, a position of a down arrow represents timing at which the transfer instruction is asserted for the path. Furthermore, a number denoted above the down arrow represents an order in which the transfer instructions have been asserted. Note that this is the same in FIG. 6 described below.

In the transfer instruction priority mode, the parameter transfer unit 94 transfers a parameter corresponding to each of the paths at the timing illustrated in FIG. 5, for example.

In the example in FIG. 5, the transfer instruction for a third path is asserted at time t1. Subsequently, the transfer instruction for a second path is asserted at time t2. Subsequently, the transfer instruction for a first path is asserted at time t3. Then, at time t4, the gate signal for the first path is negated.

At the time t4, the transfer instruction is asserted and the gate signal is negated only for the first path. Accordingly, from the time t4, the parameter transfer unit 94 transfers the parameter corresponding to the first path from the main memory 30 to the corresponding parameter register 84.

Subsequently, the gate signal for the second path is negated at time t5. Then, at time t6, the gate signal for the third path is negated as soon as the transfer of the parameter of the first path is completed.

At the time t6, the transfer instruction is asserted and the gate signal is negated for both of the second path and the third path. Therefore, the parameter transfer unit 94 determines priority in the transfer instruction priority mode and determines the third path as the path corresponding to the parameter to be transferred next by prioritizing the third path, for which the transfer instruction has been asserted first, over the second path. Accordingly, from the time t6, the parameter transfer unit 94 transfers the parameter corresponding to the third path from the main memory 30 to the corresponding parameter register 84.

Then, transfer of the parameter corresponding to the third path is completed at time t7. At the time t7, the transfer instruction is asserted and the gate signal is negated only for the second path. Therefore, the parameter transfer unit 94 determines the second path as the path corresponding to the parameter to be transferred next. Accordingly, from the time t7, the parameter transfer unit 94 transfers the parameter corresponding to the second path from the main memory 30 to the corresponding parameter register 84.

Then, at time t8, the transfer instruction for a fourth path is asserted. Subsequently, at time t9, transfer of the parameter corresponding to the second path is completed. Subsequently, at time t10, the transfer instruction for a fifth path is asserted. Then, at time t11, the gate signal for the fourth path and a gate signal for a fifth path are simultaneously negated.

At time t11, the transfer instruction is asserted and the gate signal is negated for both of the fourth path and the fifth path. Therefore, the parameter transfer unit 94 determines the priority in the transfer instruction priority mode and determines the fourth path as the path corresponding to the parameter to be transferred next by prioritizing the fourth path, for which the transfer instruction has been asserted first, over the fifth path. Accordingly, from the time t11, the parameter transfer unit 94 transfers the parameter corresponding to the fourth path from the main memory 30 to the corresponding parameter register 84.

Then, transfer of the parameter of the fourth path is completed at time t12. At the time t12, the transfer instruction is asserted and the gate signal is negated for only the fifth path. Therefore, the parameter transfer unit 94 determines the fifth path as the path corresponding to the parameter to be transferred next. Accordingly, from the time t12, the parameter transfer unit 94 transfers the parameter corresponding to the fifth path from the main memory 30 to the corresponding parameter register 84.

In the transfer instruction priority mode as above, for example, in a case where the gate signals for the plurality of paths are negated in an overlapping manner during the same period, it is possible to specifically control the order of the transfer of the parameter.

Figure 6:
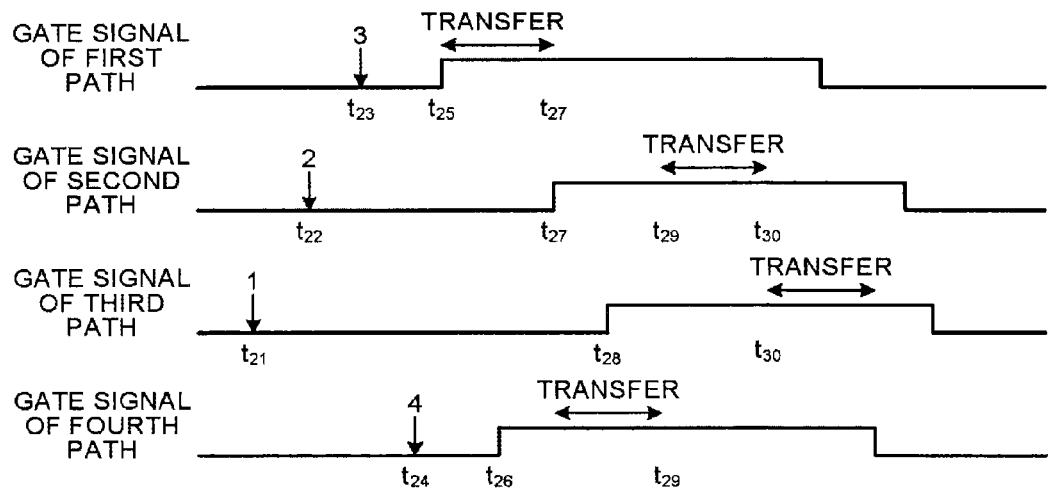
FIG. 6 is a view illustrating the timing of the transfer of the parameter in a case where negation of a gate signal is prioritized.

FIG. 6 is a view illustrating the timing of the transfer of the parameter in a case where negation of the gate signal is prioritized.

In the gate signal priority mode, for example, the parameter transfer unit 94 transfers a parameter corresponding to each of the paths at the timing illustrated in FIG. 6.

In an example in FIG. 6, the transfer instruction for the third path is asserted at time t21. Subsequently, the transfer instruction for the second path is asserted at time t22. Subsequently, the transfer instruction for the first path is asserted at time t23. Subsequently, the transfer instruction for the fourth path is asserted at time t24.

Then, at time t25, the gate signal for the first path is negated. At the time t25, the transfer instruction is asserted and the gate signal is negated for only the first path. Accordingly, from the time t25, the parameter transfer unit 94 transfers the parameter corresponding to the first path from the main memory 30 to the corresponding parameter register 84.

Subsequently, the gate signal of the fourth path is negated at time t26. Then, at time t27, the gate signal for the second signal is negated as soon as the transfer of the parameter corresponding to the first path is completed.

At the time t27, the transfer instruction is asserted and the gate signal is negated for both of the second path and the fourth path. Therefore, the parameter transfer unit 94 determines priority in the gate signal priority mode and determines the fourth path as the path corresponding to the parameter to be transferred next by prioritizing the fourth path, for which the gate signal has been negated first, over the second path. Accordingly, from the time t27, the parameter transfer unit 94 transfers the parameter corresponding to the fourth path from the main memory 30 to the corresponding parameter register 84.

Subsequently, at time t28, the gate signal of the third path is negated. Subsequently, at time t29, transfer of the parameter corresponding to the fourth path is completed. At the time t29, the transfer instruction is asserted and the gate signal is negated for both of the second path and the third path. Therefore, the parameter transfer unit 94 determines the priority in the gate signal priority mode and determines the second path as the path corresponding to the parameter to be transferred next by prioritizing the second path, for which the gate signal has been negated first, over the third path. Accordingly, from the time t29, the parameter transfer unit 94 transfers the parameter corresponding to the second path from the main memory 30 to the corresponding parameter register 84.

Subsequently, at time t30, transfer of the parameter corresponding to the second path is completed. At the time t30, the transfer instruction is asserted and the gate signal is negated only for the third path. Therefore, the parameter transfer unit 94 determines the third path as the path corresponding to the parameter to be transferred next. Accordingly, from the time t30, the parameter transfer unit 94 transfers the parameter corresponding to the third path from the main memory 30 to the corresponding parameter register 84.

In the transfer instruction priority mode as above, for example, in a case where a period of negation is the same for multiple gate signals, the transfers of the parameters can be sequentially performed in descending order of the remaining period of negation of the path. Accordingly, in the transfer instruction priority mode, it is possible to decrease a possibility that the transfer of the parameter is not performed on time.

FIG. 7 is a view illustrating timing in a case where the transfer of the parameter is cancelled or the parameter is retransferred.

Since the parameter DMAC 85 controls timing of the transfer to the parameter register 84, the CPU 56 does not manage whether or not the parameter DMAC 85 is operating or not. Accordingly, the parameter DMAC 85 operates so as to avoid competition with operation of the CPU 56. Specifically, the parameter DMAC 85 always monitors an access signal of the CPU 56 to the parameter register 84. During a period in which the CPU 56 is accessing, the parameter DMAC 85 is on standby for the processing, and the parameter DMAC 85 accesses the parameter register 84 during a period in which the CPU 56 is not accessing.

The competition occurs when the CPU 56 accesses the parameter register 84 in the same cycle as a cycle in which the parameter DMAC 85 has started the transfer of the parameter or when the CPU 56 has started access to the parameter register 84 while the parameter DMAC 85 is performing the transfer of the parameter. In this case, the parameter DMAC 85 operates as illustrated in FIG. 7.

Note that in FIG. 7, a clock represents a clock of a system, and a number added above the clock denotes an arbitrary added clock number.

First, at the rise of a first clock, the parameter DMAC 85 starts transfer of data since there is no access by the CPU 56. At the rise of a second clock, the parameter DMAC 85 continues the access since there is still no access by the CPU 56. Subsequently, at the rise of a third clock, the parameter DMAC 85 completes the transfer of the data. A data transfer period is set to two cycles in an example in FIG. 7; however, it may be set to any length of time.

Subsequently, at the rise of a fourth clock, the parameter DMAC 85 is on standby for processing until the next access.

Then, at the rise of a fifth clock, the parameter DMAC 85 starts the transfer of the data. Note, however, that the access by the CPU 56 is started at the same clock.

Then, at the rise of a sixth clock, the parameter DMAC 85 detects the access by the CPU 56 and cancels the transfer of the data. Since the transfer of the data is not completed, the parameter DMAC 85 holds the data of which the transfer has been cancelled.

Then, at the rise of a tenth clock, since there is no access by the CPU 56, the parameter DMAC 85 retransfers the data that has been temporarily held (data of which the transfer has been cancelled). In the example in FIG. 7, the parameter DMAC 85 sets a period between completion of the access by the CPU 56 and start of transfer of the next data as one cycle; however, it may be set to any cycle.

As above, since the parameter DMAC 85 operates and monitors the access by the CPU 56, there is no influence on a software program executed by the CPU 56, whereby it is possible to decrease a processing load of the CPU 56.

In the image processing device 55 according to the embodiment as above, in a case where the transfer instruction is asserted and the gate signal is negated by the CPU 56, the parameter DMAC 85 transfers the parameter from the main memory 30 to the corresponding parameter register 84. Thus, according to the image processing device 55, it is possible to decrease the load of the CPU 56 without making the CPU 56 to manage the timing to transfer the parameter.

Furthermore, in the image processing device 55 according to the embodiment, since the parameter DMAC 85 transfers the parameter per one path by determining the priority among the paths for the image processing, it is not necessary for the CPU 56 to control the priority of each of the paths, whereby it is possible to decrease the load of the CPU 56.

Moreover, in the image processing device 55 according to the embodiment, since the parameter DMAC 85 monitors the access by the CPU 56 to the parameter register 84, no competition occurs between the parameter DMAC 85 and the CPU 56, whereby it is possible to further decrease a monitoring load of the CPU 56.

According to the present invention, it is possible to reduce the load on the processor without causing the processor such as the CPU to manage the timing of the transfer of the parameter used in the image processing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An image processing device comprising:
 a main memory to store therein a parameter used in image processing;
 a parameter register to temporarily store therein the parameter;

an image processor to execute the image processing on image data by using the parameter stored in the parameter register; and parameter transfer circuitry to transfer the parameter stored in the main memory to the parameter register during a period in which the image processing is not executed, wherein the image processor executes the image processing on each piece of image data of a plurality of paths, the image processing device includes a plurality of parameter registers to temporarily store therein parameters that are used in the image processing and that respectively correspond to pieces of the image data of the plurality of paths, the parameter transfer circuitry transfers, during a period in which the image processing on image data of a target path is not executed, a parameter corresponding to the image data of the target path from the main memory to an associated parameter register, the image processing device includes a plurality of start registers to store transfer instructions that are given from a processor and that respectively correspond to the pieces of the image data of the plurality of paths, the parameter transfer circuitry, when a transfer instruction is asserted to any of the plurality of start registers, transfers a parameter corresponding to image data of a corresponding path from the main memory to the associated parameter register, the image processing device includes a gate order storage to store therein an order in which gate signals are negated, the gate signals each representing an execution period of the image processing on the image data of each of the plurality of paths, and the parameter transfer circuitry determines a path corresponding to the parameter to be transferred by prioritizing the order in which the gate signals are negated.

2. The image processing device according to claim 1, further comprising:

an instruction order storage to store therein an order in which the transfer instructions are asserted to the plurality of start registers, wherein the parameter transfer circuitry determines the path corresponding to the parameter to be transferred by prioritizing the order in which the transfer instructions are asserted.

3. The image processing device according to claim 1, further comprising:

a weight controller to instruct cancellation of transfer of the parameter by the parameter transfer circuitry during a period in which the processor is accessing.

4. The image processing device according to claim 3, wherein the parameter transfer circuitry, after the transfer of the parameter is cancelled, retransfers the parameter of which the transfer has been cancelled to a corresponding parameter register.

5. An image processing method performed in an image processing apparatus that includes a main memory, an image processor, parameter transfer circuitry, a plurality of parameter registers, a plurality of start registers, and a gate order storage, the method comprising:

storing a parameter used in image processing in the main memory;

temporarily storing the parameter in a parameter register;

executing, by the image processor, the image processing on image data by using the parameter stored in the parameter register;

transferring, by the parameter transfer circuitry, the parameter stored in the main memory to the parameter register during a period in which the image processing is not executed;

executing, by the image processor, the image processing on each piece of image data of a plurality of paths;

temporarily storing parameters, in the plurality of parameter registers, that are used in the image processing and that respectively correspond to pieces of the image data of the plurality of paths;

transferring, by the parameter transfer circuitry during a period in which the image processing on image data of a target path is not executed, a parameter corresponding to the image data of the target path from the main memory to an associated parameter register;

storing, in the plurality of start registers, transfer instructions that are given from a processor and that respectively correspond to the pieces of the image data of the plurality of paths;

transferring, by the parameter transfer circuitry when a transfer instruction is asserted to any of the plurality of start registers, a parameter corresponding to image data of a corresponding path from the main memory to the associated parameter register;

storing, by the gate order storage, an order in which gate signals are negated, the gate signals each representing an execution period of the image processing on the image data of each of the plurality of paths; and determining, by the parameter transfer circuitry, a path corresponding to the parameter to be transferred by prioritizing the order in which the gate signals are negated.

6. The image processing device according to claim 1, wherein the parameter transfer circuitry transfers a read request of the parameter to be transferred corresponding to the determined path to the main memory.

7. The image processing device according to claim 6, wherein the parameter transfer circuitry receives the parameter to be transferred from the main memory, and temporarily stores the parameter to be transferred in an internal memory prior to transferring the parameter to be transferred to the parameter register.

8. The image processing device according to claim 1, further comprising a weight controller that monitors whether or not the processor is accessing the parameter register, and that instructs to cancel transfer of the parameter to be transferred during a period in which the processor is accessing the parameter register.

* * * * *